(12) United States Patent
Lee et al.

(10) Patent No.: US 7,804,749 B2
(45) Date of Patent: *Sep. 28, 2010

(54) OPTICAL INFORMATION STORAGE MEDIUM AND METHOD OF AND APPARATUS FOR RECORDING DATA THEREON

(75) Inventors: Kyung-geun Lee, Gyeonggi-do (KR); Jung-wan Ko, Gyeonggi-do (KR); In-sik Park, Gyeonggi-do (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/432,389

(22) Filed: May 12, 2006

(65) Prior Publication Data

US 2006/0203662 A1 Sep. 14, 2006

Related U.S. Application Data

(63) Continuation of application No. 11/265,124, filed on Nov. 3, 2005, which is a continuation of application No. 10/418,300, filed on Apr. 18, 2003.

(30) Foreign Application Priority Data

| Apr. 24, 2002 | (KR) | ............ | 10-2002-0022460 |
| May 6, 2002 | (KR) | ............ | 10-2002-0024830 |
| May 9, 2002 | (KR) | ............ | 10-2002-0025679 |

(51) Int. Cl.
G11B 7/00 (2006.01)

(52) U.S. Cl. ............ 369/47.38; 369/47.1; 369/47.49; 369/53.3

(58) Field of Classification Search ............ 369/47.38, 369/53.3
See application file for complete search history.

(56) References Cited

U.S. PATENT DOCUMENTS 5,835,462 A 11/1998 Mimnagh (Continued)

FOREIGN PATENT DOCUMENTS

EP 0 965 988 12/1999

(Continued)

OTHER PUBLICATIONS

U.S. Appl. No. 10/418,300, filed Apr. 18, 2003, Kyung-geun Lee et al., Samsung Electronics Co., Ltd.

(Continued)

*Primary Examiner*—Lixi Chow
(74) *Attorney, Agent, or Firm*—NSIP Law (57) ABSTRACT

An optical information storage medium and a method of recording thereon. The optical information storage medium has a lead-in area, a user data area and a lead-out area, and data indicating a maximum and/or a minimum writing speed, maximum and minimum writing speeds, or compatible writing speeds is recorded in a recordable region of at least one of the lead-in area and the lead-out area. The optical information storage medium and the method of recording on the media enable a disc drive to reliably record data on a disc which cannot achieve a prescribed recording speed due to manufacturing conditions, at an optimal speed considering the prerecorded writing speed data.

18 Claims, 4 Drawing Sheets

U.S. PATENT DOCUMENTS

| | | |
|---|---|---|
| 6,463,020 B2 * | 10/2002 | Minemura et al. ....... 369/47.53 |
| 6,469,967 B1 | 10/2002 | Mau et al. |
| 6,556,524 B1 * | 4/2003 | Takeshita ................. 369/47.43 |
| 6,597,647 B2 | 7/2003 | Kanno et al. |
| 6,894,961 B1 * | 5/2005 | Osakabe ................. 369/47.28 |
| 2002/0021637 A1 | 2/2002 | Iida et al. |
| 2002/0021639 A1 | 2/2002 | Obata et al. |
| 2002/0027848 A1 * | 3/2002 | Iida et al. ................. 369/47.51 |
| 2002/0110063 A1 | 8/2002 | Yamada et al. |
| 2002/0176341 A1 * | 11/2002 | Ko et al. ................. 369/53.21 |
| 2002/0191506 A1 | 12/2002 | Okamoto et al. |
| 2003/0012088 A1 | 1/2003 | Bakx et al. |
| 2004/0240350 A1 | 12/2004 | Tanii et al. |

FOREIGN PATENT DOCUMENTS

| | | |
|---|---|---|
| EP | 1 081 696 | 3/2001 |
| EP | 1 471 506 | 10/2004 |
| JP | 03-273566 | 12/1991 |
| JP | 11-513521 | 11/1999 |
| JP | 2000-113458 | 4/2000 |
| JP | 2000-163751 | 6/2000 |
| JP | 2001-283443 | 10/2001 |
| KR | 2000-5588 | 1/2000 |
| KR | 2001-11557 | 2/2001 |
| KR | 2001-0068381 | 7/2001 |
| KR | 2002-6427 | 1/2002 |
| WO | WO 97/13244 | 4/1997 |
| WO | WO03/067581 | 8/2003 |

OTHER PUBLICATIONS

U.S. Appl. No. 11/265,124, filed Nov. 3, 2005, Kyung-geun Lee et al., Samsung Electronics Co., Ltd.
Office Action issued in Chinese Patent Application No. 03813192.7 on Jun. 30, 2006.
Office Action issued in Japanese Patent Application No. 2004-500288 on Sep. 5, 2006.
Office Action issued in Korean Patent Application No. 2002-25679 on Nov. 20, 2006.
Office Action issued in Canadian Patent Application No. 2,483,163 on Nov. 1, 2006.
Office Action issued by Japanese Patent Office in Japanese Patent Application No. 2004-500288 on Jan. 16, 2007.
Supplementary European Search Report issued in European Patent Application No. 03710480.9 on Jul. 30, 2008.
Canadian Office Action dated Nov. 29, 2007 of the Canadian Patent Application No. 2,483,163.
International Search Report issued on Jul. 10, 2003, in counterpart International Application No. PCT/KR03/00510 (3 pages).
Japanese Office Action issued on Oct. 20, 2009, in counterpart Japanese Application No. 2004-500288 (3 pages, in Japanese, no English translation).
Japanese Office Action issued on May 18, 2010, in corresponding Japanese Application No. 2004-500288 (15 pages).

* cited by examiner

| BP | DESCRIPTION | NUMBER OF BYTES |
|---|---|---|
| 0 | SPEED FLAG FOR WRITING SPEED | ONE BYTE |
| 1~ | RESERVED | RESERVED |

FIG. 3A

| b7  b6 | b5  b4  b3  b2  b1  b0 |
|---|---|
| MAXIMUM WRITING SPEED | RESERVED |

FIG. 3B

| b7 b6 b5 b4 | b3 b2 b1 b0 |
|---|---|
| MAXIMUM WRITING SPEED | MINIMUM WRITING SPEED |

| b7 | b6 | b5 | b4 | b3 | b2 | b1 | b0 |
|---|---|---|---|---|---|---|---|
|  |  | SPEED FLAG | | FOR SPEED |  |  |  |

OPTICAL INFORMATION STORAGE MEDIUM AND METHOD OF AND APPARATUS FOR RECORDING DATA THEREON

CROSS-REFERENCE TO RELATED APPLICATIONS

This application is a continuation of application Ser. No. 11/265,124 filed on Nov. 3, 2005, currently pending, which is a continuation of U.S. patent application Ser. No. 10/418,300 filed on Apr. 18, 2003, currently pending, which claims the benefit of Korean Patent Application Nos. 2002-22460 filed on Apr. 24, 2002, 2002-24830 filed on May 6, 2002, and 2002-25679 filed on May 9, 2002, in the Korean Intellectual Property Office, the disclosures of which are incorporated herein by reference in their entirety.

BACKGROUND OF THE INVENTION

1. Field of the Invention

The present invention relates to an optical information storage medium and a method of recording data thereon, and more particularly, to an optical information storage medium in which data indicating a maximum writing speed, maximum and/or minimum writing speeds, or compatible writing speeds is recorded in a recordable region other than a user data area so that a disc drive can recognize the data and record information on the optical information medium at an optimal speed, and a method of recording the data on the medium.

2. Description of the Related Art

An optical information storage medium, e.g., an optical disc, is generally employed as an information storage medium of an optical pick-up device that records and reproduces information on and from the optical disc without contacting the optical disc. Optical discs include compact discs (CDs) and digital versatile discs (DVDs), which have different storage capacities. In addition, various sub-categories of the optical discs include CD-Recordables (CD-Rs), CD-Rewritables (CD-RWs), Digital Versatile Disc-rewritables (DVD-RWs), Digital Versatile Disc-Random Access Memories (DVD-RAMs), and Digital Versatile Disc Rewritables (DVD+RWs).

As a recording speed of the optical discs increases, performance of disc drives has been improved to record data on the optical disc at the increased recording speed. In order to perform reliable recording, the disc drives operate such that they can satisfy recording characteristics accompanying the recording speed of the optical disc. However, while general disc drives reliably record data on low-speed discs, they do not satisfy the recording characteristics of high-speed discs, and thus they frequently cause damage to user data. Likewise, the disc drives for the high-speed discs can cause the damage to the user data when recording the information on the low-speed discs.

Accordingly, information on the recording speed of the optical disc is necessary for reliably recording data. The information is recorded in a predetermined region of the optical disc, and the disc drive recognizes the prescribed recording speed of the optical disc and records data on the optical disc at an optimal speed. For example, in a case of a 2X-speed disc, the information on the recording speed of the 2X-speed disc is recorded on a predetermined region of the 2X-speed disc when the 2X-speed disc is manufactured, and thus a disc drive can refer to the prescribed recording speed and the accompanying recording characteristics and thus can record the data on the 2X-speed disc at a speed of 2X.

However, the prescribed recording speed of a disc is not sometimes satisfied in a disc test. For example, a 4X-speed disc is manufactured, and the information on the recording speed of the 4X-speed disc, i.e., 4X, is recorded on a predetermined region of the 4X-speed disc, but due to various factors during manufacturing the 4X-speed disc, the recording speed of the 4X-speed disc does not reach the prescribed 4X speed. Such a disc cannot be used as the 4X-speed disc, but it may be appropriate to be used at an actual recording speed, such as a 3X speed disc or a 4X speed disc. If the above-described disc is used, the disc drive recognizes the disc as the 4X-speed disc because the recording speed is recorded as the 4X speed, and thus the disc drive records the data on the 4X-speed disc at the prescribed 4X speed. However, the actual recording speed is not 4X, and thus the recorded data can be damaged. Therefore, such discs which are manufactured to be 4X- speed discs but turn out to be 3X-speed discs or 2X-speed discs, cannot be used and are discarded.

It is very wasteful to discard the discs which fail to achieve a desired recording speed due to various manufacturing conditions but achieve a lower recording speed.

SUMMARY OF THE INVENTION

The present invention provides an optical information storage medium which is capable of reliably recording user data at an optimal speed according to information indicating the medium's maximum writing speed, maximum and minimum writing speeds, or compatible writing speeds stored in a recordable region other than a user data area, and a method of recording on the medium.

Additional aspects and advantages of the invention will be set forth in part in the description which follows and, in part, will be obvious from the description, or may be learned by practice of the invention.

According to one aspect of the present invention, an optical information storage medium includes a lead-in area, a user data area, and a lead-out area, wherein a maximum writing speed is recorded in a recordable region of at least one of the lead-in area and the lead-out area.

The maximum writing speed is recorded in recordable regions of both the lead-in area and the lead-out area.

The recordable region includes a disc ID zone in which disc ID information is recorded and which has at least one disc ID information region and a reserved region, and the maximum writing speed is recorded in at least one disc ID information region or the reserved region.

A minimum writing speed is further recorded in the recordable region of at least one of the lead-in area and the lead-out area.

According to another aspect of the present invention, an optical information storage medium includes a lead-in area, a user data area and a lead-out area, wherein information indicating compatible writing speeds is recorded in a recordable region of at least one of the lead-in area and the lead-out area.

Information on each of the compatible writing speeds is recorded by a corresponding bit of a predetermined byte of the recordable region.

According to yet another aspect of the present invention, a method of recording on an optical information storage medium having a lead-in area, a user data area, and a lead-out area includes recording a maximum writing speed in a recordable region of at least one of the lead-in area and the lead-out area; and recording data on the optical information storage medium at an optimal speed determined based on the maximum wiring speed.

According to yet another aspect of the present invention, a method of recording on an optical information storage medium having a lead-in area, a user data area and a lead-out area includes recording information indicating compatible writing speeds in a recordable region of at least one of the lead-in area and the lead-out area; and recording data on the optical information storage medium at an optimal speed determined based on the maximum writing speed.

According to another aspect to the present invention, a method of recording data on an optical information storage medium having a lead-in area, a user data area, and a lead-out area in a reproducing apparatus includes reading information representing a writing speed from a recordable region of at least one of the lead-in area and the lead-out area, and recording the data on the optical information storage medium at the writing speed of the information.

According to another aspect to the present invention, a method of reading data from an optical information storage medium having a lead-in area, a user data area, and a lead-out area in a reproducing apparatus includes reading information representing a writing speed from a recordable region of at least one of the lead-in area and the lead-out area, and rotating the optical information storage medium at the writing speed according to the read information.

According to another aspect to the present invention, a method of recording data from an optical information storage medium having a lead-in area, a user data area, and a lead-out area in a reproducing apparatus, one of the lead-in and lead-in areas having an embossed data zone having first information representing a first writing speed, a mirror zone, and a rewritable data zone, includes erasing first information representing a first writing speed, which is recorded in a recordable region of the rewritable data zone of at least one of the lead-in area and the lead-out area, and recording second information representing a second writing speed in the recordable region of the writing-rewritable data zone of the at least one of the lead-in area and the lead-out area.

According to another aspect to the present invention, an optical information storage medium having a lead-in area having an embossed data zone, a mirror zone, and a rewritable data zone, a user data area, and a lead-out area, wherein at least one of the lead-in area and the lead-out area includes an embossed data zone, a mirror zone, and a rewritable data zone having a recordable region, and a writing speed is recorded in the recordable region of the at least one of the lead-in area and the lead-out area.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 1:
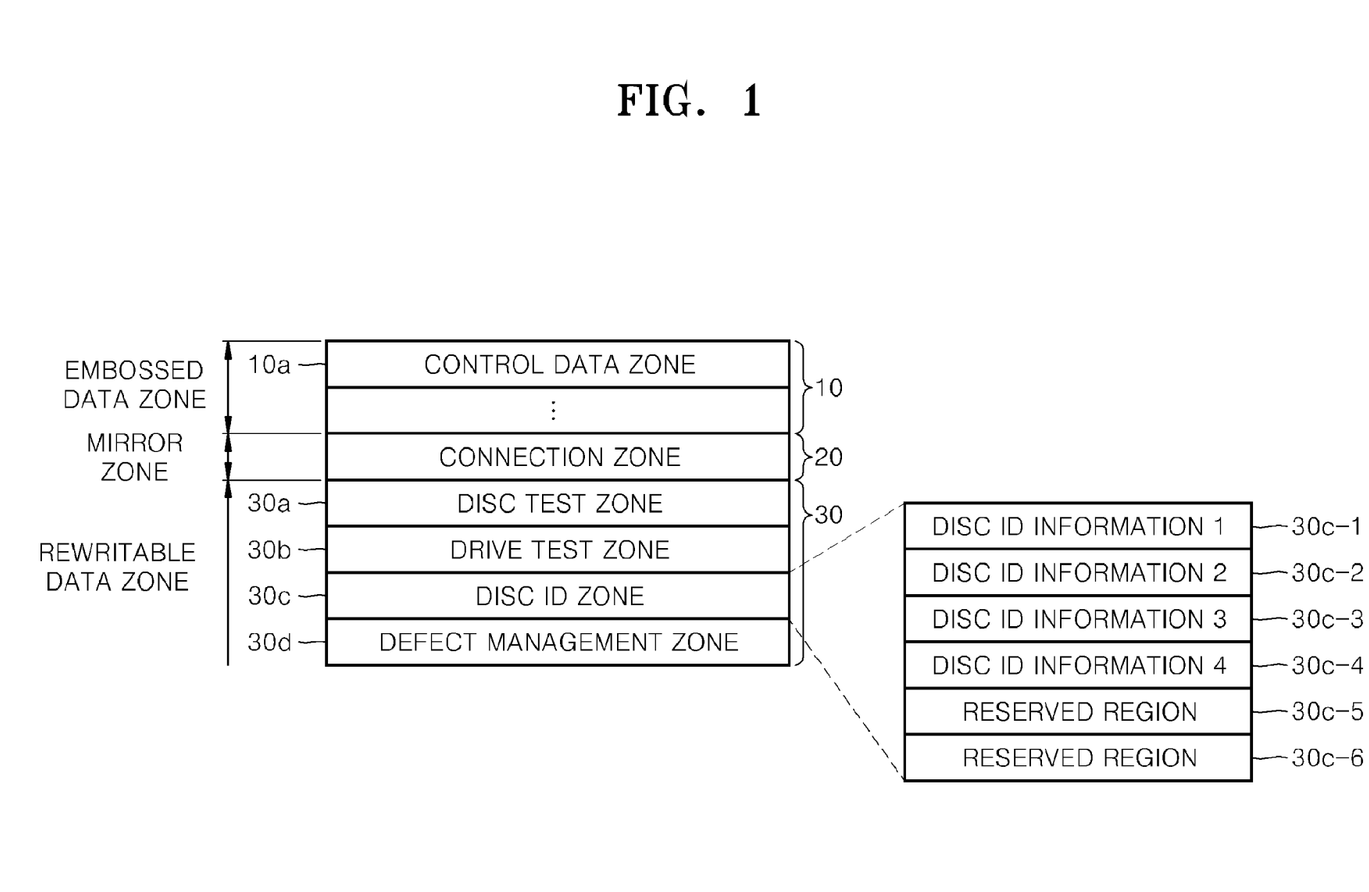
FIG. 1 is a diagram of a structure of a lead-in area of an optical information storage medium according to an embodiment of the present invention.

FIG. 1 shows a lead-in area of an optical information storage medium, such as an optical disc, (hereinafter, collectively called "discs"), according to an embodiment of the present invention. The optical information storage medium includes the lead-in area, a user data area and a lead-out area. The lead-in area includes an embossed data zone 10 in which basic disc information is recorded in an innermost area of the disc in a form of pits, a mirror zone 20, and a rewritable (recordable) data zone 30.

The embossed data zone 10 includes a control data zone 10a in which a prescribed recording speed of the disc is recorded. The prescribed recording speed represents a recording speed, such as a 2X speed, a 3X speed or a 4X speed, which is predetermined when the disc is designed, and the prescribed recording speed is one piece of the basic disc information recorded in the control data zone 10a. A disc drive recognizes the prescribed recording speed when recording data on the disc, and the disc drive records the data on the disc at an optimal speed considering the prescribed recording speed recorded on the disc.

The mirror zone 20 may be a connection zone which connects the embossed data zone 10 with the rewritable data zone 30.

The rewritable data zone 30 may include a disc test zone 30a, a drive test zone 30b, a disc ID zone 30c and a defect management zone 30d. The disc ID zone 30c includes at least one disc ID information region in which disc ID information is recorded. In the present embodiment, first through fourth disc ID information regions 30c-1, 30c-2, 30c-3 and 30c-4 are included in the disc ID zone 30c. Also, reserved regions 30c-5 and 30c-6 can be further included as regions in which other information can be recorded. The lead-out area has a similar structure to the lead-in area, and thus a detailed description of the lead-out area will be omitted.

It is possible that optical information storage media satisfy the prescribed recording speed recorded in the control data zone 10a. However, an actual recording speed may be lower than the prescribed recording speed due to disc manufacturing conditions. In this case, it is possible that information on the actual recording speed is recorded on the disc and referred to as a driving (rotation) speed of the disc in the disc drive instead of the prescribed recording speed. This is accomplished by the present invention.

A method of recording (writing) the information on the optical information storage medium (disc) according to an embodiment of the present invention includes recording a maximum writing speed of the medium in at least one recordable (rewritable) region of the lead-in area and the lead-out area. For example, the maximum writing speed can be recorded in a predetermined region of the rewritable data zone 30.

Figure 2:
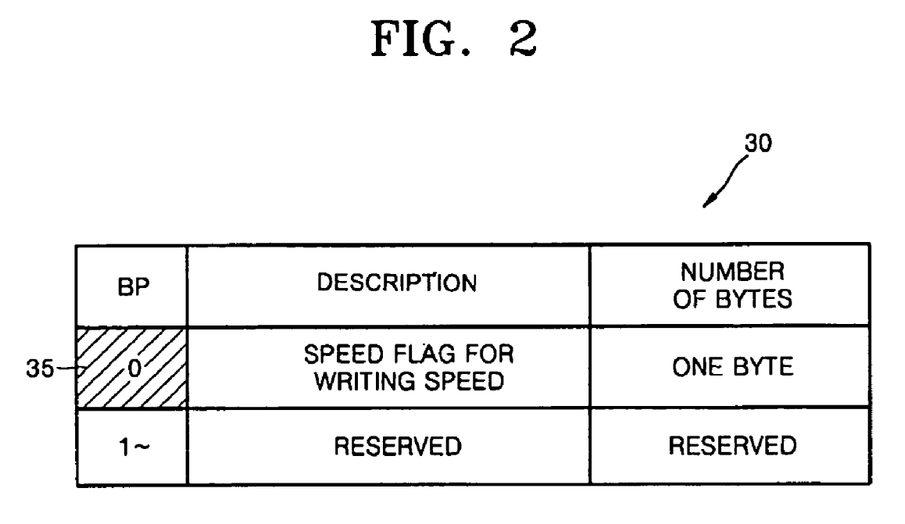
FIG. 2 is a diagram of a structure of a part of the lead-in area of the optical information storage medium shown in FIG. 1.

Referring to FIG. 2, the predetermined region of the writable data zone 30 includes a plurality of bytes, and the maximum writing speed can be recorded as one of the bytes. For example, a speed flag for the maximum writing speed can be recorded in a 0 byte position BP 35 of the predetermined region of the writable data zone 30. Alternatively, the maximum writing speed can be recorded in a desired byte position such as a 1-byte position BP of FIG. 2.

Figure 3A:
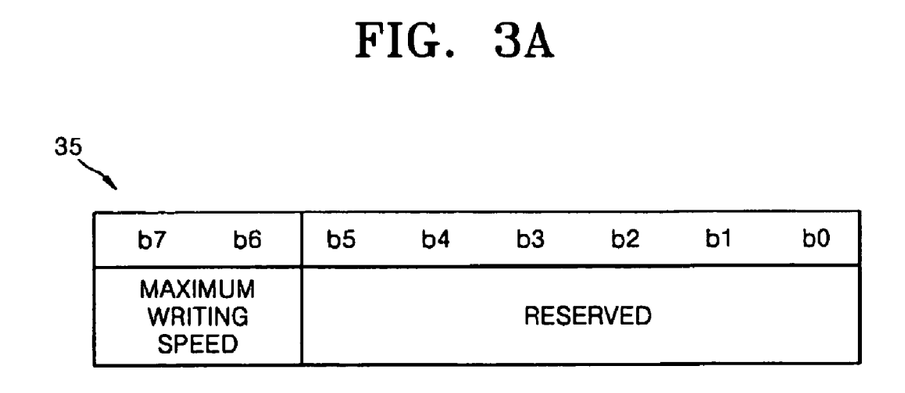
FIG. 3A is a diagram explaining an optical information storage medium and a method of recording information thereon according to an embodiment of the present invention.

The 0 byte position BP 35 includes 8 bits from bit 0 through bit 7, i.e., b0 through b7, as shown in FIG. 3A, and a speed flag for the maximum writing speed can be recorded in the bit b7 and the bit b6. Other bits are left as reserved regions. More specifically, the following speed flags for the maximum writing speed can be recorded in the bit b7 and the bit b6.

In a case of a 5X-speed disc, if the speed flag is 00b, it is possible to record data on the 5X-speed disc at a 5X speed. If the speed flag is 01b, the maximum writing speed of the disc is a 2X speed. If the speed flag is 10b, the maximum writing speed of the disc is a 3X speed. Finally, if the speed flag is 11b, the maximum writing speed of the disc is a 4X speed.

In a 3X-speed disc, if the speed flag is 00b, it is possible to record data on the 3X-speed disc at the 3X speed. If the speed flag is 01b, the maximum recording speed is a 2X-speed.

In addition, the speed flag can be includes 3 bits for the discs having a disc speed of more than a 6X speed. For example, in a 6X-speed disc, if the speed flag is 000b, it is possible to record data on the 6X-speed disc at the 6X speed. If the speed flag is 001b, the maximum writing speed is the 2X speed. If the speed flag is 010b, the maximum writing speed is the 3X speed.

In the above examples, the speed flag of 2 or 3 bits is used to record the maximum writing speed in the recordable region. However, in some cases, the speed flag of 4-8 bits can be used. Also, it is sometimes possible to record the maximum writing speed using at least one bit of one byte of the recordable region.

The maximum writing speed is recorded in the predetermined region of the writable data zone 30 of the lead-in area, and disc drives record the data on the disc at an optimal recording speed considering the maximum writing speed of the disc.

According to an aspect of the invention, the maximum writable speed can be recorded in one of the disc ID information regions 30c-1, 30c-2, 30c-3, and 30c-4 of the disc ID zone 30c, or one of the reserved regions 30c-5 or 30c-6 of the disc ID zone 30c. In the above description, the maximum writing speed is recorded in the recordable region of the lead-in area. However, it can alternatively be recorded in a recordable region of the lead-out area at an outer portion of the medium, or in the recordable regions of both the lead-in area and the lead-out area.

In the optical information storage medium and method of recording the information on the same according to this embodiment of the present invention, the maximum writing speed is recorded in a predetermined region of the recordable region of at least one of the lead-in area and/or the lead-out area. Here, the maximum writing speed can be recorded as the speed flag by using at least one bit of predetermined bytes.

In the above description, the maximum writing speed is recorded in the 0 byte position BP. However, the maximum writing speed may be recorded in another byte position BP.

A method of recording the information on the optical information storage medium according to another embodiment of the present invention includes recording the maximum writing speed and a minimum writing speed of the medium in the recordable region of at least one of the lead-in area and the lead-out area. For example, the maximum writing speed and the minimum writing speed can be recorded in the predetermined region of the rewritable data zone 30. Here, the rewritable data zone 30 is included in the lead-out area as well as in the lead-in area.

Figure 3B:
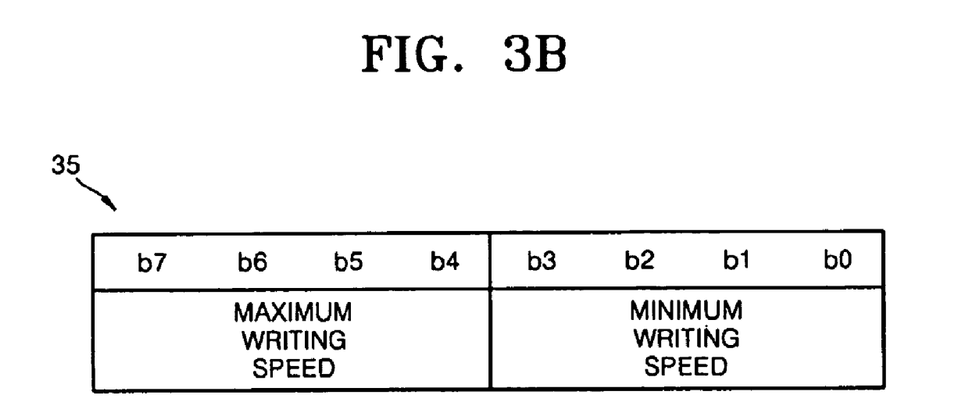
FIG. 3B is a diagram explaining an optical information storage medium and a method of recording information thereon according to another embodiment of the present invention.
Figure 4:
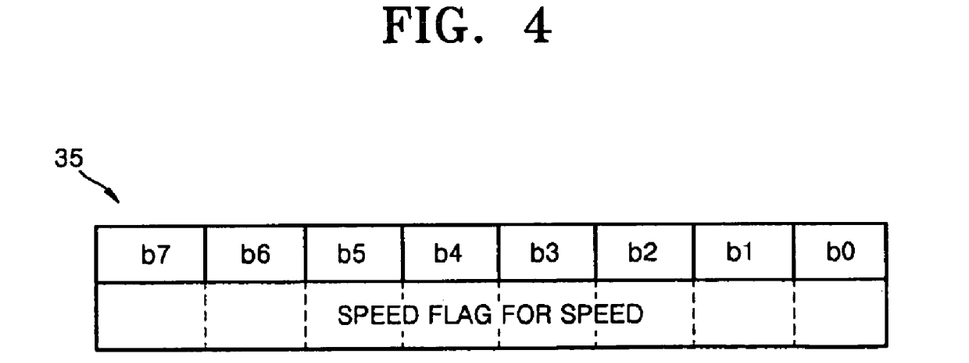
FIG. 4 is a diagram explaining an optical information storage medium and a method of recording information thereon according to another embodiment of the present invention.

The maximum writing speed and the minimum writing speed can be recorded in the predetermined region of the rewritable data zone 30, e.g., the disc ID information regions 30c-1, 30c-2, 30c-3, 30c-4 or the reserved regions 30c-5 or 30c-6. The disc ID information regions 30c-1, 30c-2, 30c-3, 30c-4 or the reserved regions 30c-5 or 30c-6 include a plurality of bytes, and the maximum writing speed and the minimum writing speed are recorded in one byte position BP of the bytes, as shown in FIG. 3B.

In addition, it is possible that the maximum writing speed and minimum writing speed are recorded in recordable regions of both the lead-in area and the lead-out area, in order to reliably record the data.

For example, when an 8X-speed disc is found to actually be capable of recording at only 5X-7X speeds in a test of its recording characteristics, the maximum writing speed is the 7X speed, and the minimum writing speed is the 5X speed. FIG. 3B shows a case where the maximum writing speed is recorded in the bits b7, b6, b5 and b4, and the minimum writing speed is recorded in the bits b3, b2, b1 and b0. The maximum writing speed and the minimum writing speed recorded by using 4 bits can be expressed as follows:

TABLE 1

| bits | Recording speed |
| --- | --- |
| 0000b | 2X speed |
| 0001b | 3X speed |
| 0010b | 4X speed |
| 0011b | 5X speed |
| 0100b | 6X speed |
| 0101b | 7X speed |
| 0110b | 8X speed |
| 0111b | 9X speed |

Referring to table 1, the 5×-7× speeds can be expressed by 01010011b. Here, the maximum writing speed and the minimum writing speed are each indicated by using the 4 bits. However, the maximum writing speed and the minimum writing speed can be indicated by using 3 bits each or 2 bits each.

In this method of recording the information on the optical information storage medium, the maximum writing speed and the minimum writing speed are recorded in the recordable region of at least one of the lead-in area and the lead-out area. And, the maximum writing speed and the minimum writing speed can be recorded by using 2 through 4 bits each.

Hereinafter, a method of recording the information on the optical information storage medium according to another embodiment of the present invention will be described. According to this embodiment of the present invention, the method includes recording the information on writing speeds in one of predetermined regions of the recordable region of at least one of the lead-in area and the lead-out area by using one bit per writing speed.

For example, the writing speed can be recorded by using one bit of the one of the predetermined regions of the rewritable data zone of FIG. 1. The writing speed is recorded in at least one of the disc ID information regions 30c-1, 30c-2, 30c-3, 30c-4 or the reserved regions 30c-5 or 30c-6 of the rewritable data zone 30. The disc ID information regions 30c-1, 30c-2, 30c-3, 30c-4 or the reserved regions 30c-5 or 30c-6 include a plurality of bytes, and the writing speed is recorded by using one of 8 bits of one byte of the bytes.

Specifically, each bit of a predetermined bite position corresponds to a respective one of different writing speeds, and any given writing speed is recorded by a corresponding bit. For example, each bit can correspond to the respective writing speed as follows:

TABLE 2

| Bit Position (BP) | Writing speed |
|---|---|
| 7b | 9X speed |
| 6b | 8X speed |
| 5b | 7X speed |
| 4b | 6X speed |
| 3b | 5X speed |
| 2b | 4X speed |
| 1b | 3X speed |
| 0b | 2X speed |

Referring to table 2, if a bit 0 is recorded in a bit position 7b of the bit positions BPs, it is impossible to record data on the medium at a 9X speed. If a bit 1 is recorded in the bit position 7b of the bit positions BPs, it is possible to record data on the medium at the 9X speed. If the bit 0 is recorded in a bit position 6b of the bit positions BPs, it is impossible to record data on the medium at an 8X speed. If the bit 1 is recorded in the bit position 6b of the bit positions BPs, it is possible to record data on the medium at the 8X speed. The same goes for bit positions 5b, 4b, 3b, 2b, 1b, and 0b of the bit positions BPs, and thus each bit represents the information on a corresponding one of the different writing speeds and above-described recording characteristic according to one of the 0b and the 1b.

According to this embodiment of the present invention, when a 9X-speed disc is found to be actually capable of recording the data on the 9X-speed disc at only 5X-7X speeds in the test of its recording characteristics, the writing speed can be recorded as 00111000b.

Here, the writing speed information can be recorded in the recordable regions of both the lead-in area and the lead-out area in order to reliably record the data on the medium.

According to the second and third embodiments, all writing speeds can be expressed as described above, and by the recording speed information on the all writing speeds, a high-speed disc can be compatible with a disc drive for a low-speed disc.

The writing speed information is recorded only by disc manufacturers and cannot be changed or deleted once the disc is manufactured or shipped.

As described above, the optical information storage medium and the method of recording the writing speed information thereon according to the present invention enable the disc drive to record data on the disc which cannot achieve its prescribed recording speed due to manufacturing conditions, at an optimal speed according to the information on at least one of the maximum, minimum, and compatible writing speeds of the disc. The present invention may be very important considering a current trend on higher and higher speed discs.

Figure 5:
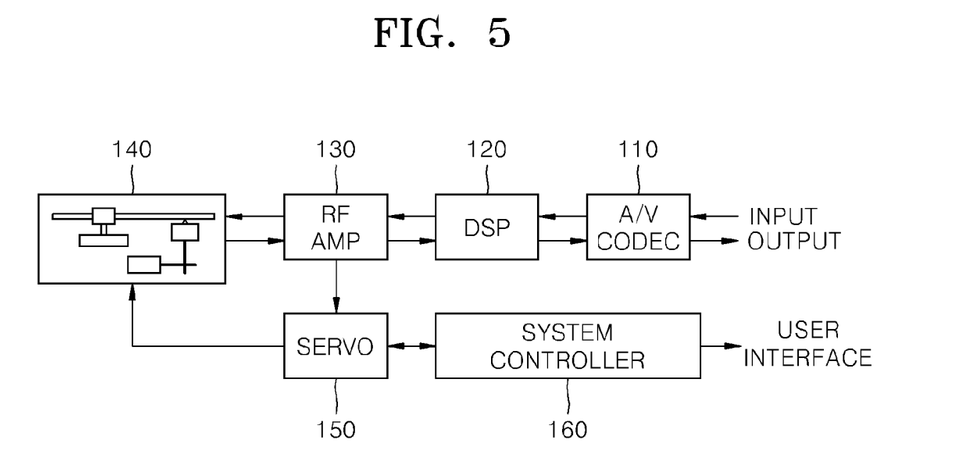
FIG. 5 is a block diagram of an apparatus for recording data and/or reproducing data on the optical information storage medium shown in FIGS. 1 through 4.

FIG. 5 is a block diagram of an apparatus for recording and/or reproducing data on/from the optical information storage medium according to the present invention. During recording, an A/V codec 110 compression-codes an externally applied A/V signal according to a predetermined compression scheme to generate compressed A/V data and supplies size information for the compressed A/V data. A digital signal processor (DSP) 120 receives the compressed A/V data supplied from the A/V codec 110, adds additional data for error correction code (ECC) processing thereto, and performs modulation using a predetermined modulation scheme. A radio frequency amplifier (RF AMP) 130 converts the modulated data from the DSP 120 into a radio frequency (RF) signal. Then, a pickup 140 records the RF signal supplied from the RF AMP 130 on the optical information storage medium mounted on a turntable of the pickup 140. A servo 150 receives information necessary for servo control from a system controller 160 and stably performs a servo function for the mounted optical information storage medium.

During playback of information data stored on the optical information storage medium, the pickup 140 picks up an optical signal from the optical information storage medium having the information data stored therein, and the information data is extracted from the optical signal. The RF AMP 130 converts the optical signal into an RF signal, and extracts a servo signal for performing the servo function, and modulated data. The DSP 120 demodulates the modulated data supplied from the RF AMP 130 corresponding to the modulation scheme used during modulation, performs an ECC process to correct errors, and eliminates added data. The servo unit 150 receives information necessary for the servo control from the RF AMP 130 and the system controller 160, and stably performs the servo function. The A/V codec 110 decodes the compressed A/V data supplied from the DSP 120 to output an A/V signal. The system controller 160 controls the overall system for recording and reproducing the information data on and from the optical information storage medium mounted on the turntable of the pickup 140. The system controller 160 reads the writing speed information and records data on the optical information storage medium at an optimal speed determined based on the writing speed information.

In addition, according to the optical information storage medium and the method of recording thereon of the present invention, it is possible to reduce the number of discs that are discarded as being defective and to prevent damage to user data due to recording the data on the discs at an unsuitable recording speed.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. An apparatus for recording data on a storage medium comprising a lead-in area, a user data area, and a lead-out area, the apparatus comprising:
  an optical pickup to record data on the storage medium; and
  a controller to control the optical pickup to record data in the user data area of the storage medium at a maximum recording speed indicated by maximum recording speed information recorded in the lead-in area and/or the lead-out area of the storage medium by a manufacturer of the storage medium during manufacture of the storage medium;
  wherein:
    the maximum recording speed is an actual maximum recording speed of the storage medium obtained by the manufacturer of the storage medium during the manufacture of the storage medium by testing actual recording characteristics of the storage medium based on a prescribed recording speed assigned to the storage medium by the manufacturer during the manufacture of the storage medium and indicated by prescribed recording speed information recorded in the lead-in area and/or the lead-out area of the storage medium by the manufacturer during the manufacture of the storage medium;

the maximum recording speed is different from the prescribed recording speed if a result of the testing indicates that the storage medium cannot record data at the prescribed recording speed;

the lead-in area and/or the lead-out area each comprises a recordable region and an embossed data region;

the maximum recording speed information is recorded in the recordable region of the lead-in area and/or the lead-out area; and the prescribed recording speed information is recorded in the embossed data region of the lead-in area and/or the lead-out area.

2. The apparatus as claimed in claim 1, wherein the recordable region comprises a disc ID zone in which disc ID information is recorded;

the disc ID zone comprises at least one disc ID information region and a reserved region; and the maximum recording speed information is recorded in at least one of the at least one disc ID information region, or in the reserved region.

3. The apparatus as claimed in claim 2, wherein the at least one of the at least one disc ID information region, or the reserved region, in which the maximum speed information is recorded comprises a predetermined byte; and the maximum recording speed information is recorded in the predetermined byte as a speed flag using at least one bit of the predetermined byte.

4. The apparatus as claimed in claim 1, wherein the recordable region comprises a predetermined byte; and the maximum recording speed information is recorded in the predetermined byte as a speed flag using at least one bit of the predetermined byte.

5. The apparatus as claimed in claim 1, wherein minimum recording speed information indicating a minimum recording speed obtained by the manufacturer during the manufacture of the storage medium is also recorded in the recordable region of the lead-in area and/or the lead-out area by the manufacturer during the manufacture of the storage medium.

6. The apparatus as claimed in claim 5, wherein the recordable region comprises a disc ID zone in which disc ID information is recorded;

the disc ID zone comprises at least one disc ID information region and a reserved region; and the maximum recording speed information and the minimum recording speed information are recorded in at least one of the at least one disc ID information region, or in the reserved region.

7. The apparatus of claim 1, wherein the maximum recording speed information was recorded in a predetermined region of the recordable region of the lead-in area and/or the lead-out area of the storage medium by the manufacturer of the storage medium during the manufacture of the storage medium; and the controller cannot control the optical pickup to record any data in the predetermined region of the recordable region of the lead-in area and/or the lead-out area of the storage medium in which the maximum recording speed information was recorded.

8. An apparatus for recording data on a storage medium comprising a user data area to record user data, and at least one non-user data area arranged adjacent to the user data area along a circumference of the storage medium to record information and comprising a recordable region and an embossed data region, the apparatus comprising:

an optical pickup to record data on the storage medium; and a controller to control the optical pickup to record data in the user data area of the storage medium at an optimal recording speed determined based on a maximum recording speed indicated by maximum recording speed information recorded in the recordable region of the at least one non-user data area of the storage medium by a manufacturer of the storage medium during manufacture of the storage medium;

wherein:

the maximum recording speed is an actual maximum recording speed of the storage medium obtained by the manufacturer of the storage medium during the manufacture of the storage medium by testing actual recording characteristics of the storage medium based on a prescribed recording speed assigned to the storage medium by the manufacturer during the manufacture of the storage medium and indicated by prescribed recording speed information recorded in the embossed data region of the at least one non-user data area of the storage medium by the manufacturer during the manufacture of the storage medium; and the maximum recording speed is different from the prescribed recording speed if a result of the testing indicates that the storage medium cannot record data at the prescribed recording speed.

9. The apparatus of claim 8, wherein minimum recording speed information indicating a minimum recording speed obtained by the manufacturer during the manufacture of the storage medium is also recorded in the recordable region of the at least one non-user data area of the storage medium by the manufacturer during the manufacture of the storage medium.

10. The apparatus of claim 8, wherein the at least one non-user data area of the storage medium is at least two non-user data areas arranged adjacent to the user data area along the circumference of the storage medium to record information; and the maximum recording speed information is recorded in the recordable region of at least two of the at least two non-user data areas of the storage medium.

11. The apparatus of claim 8, wherein the recordable region comprises a disc ID zone in which disc ID information is recorded;

the disc ID zone comprises at least one disc ID information region and a reserved region; and the maximum recording speed information is recorded in at least one of the at least one disc ID information region, or in the reserved region.

12. The apparatus of claim 11, wherein the at least one of the at least one disc ID information region, or the reserved region, in which the maximum speed information is recorded comprises a predetermined byte; and the maximum recording speed information is recorded in the predetermined byte as a speed flag using at least one bit of the predetermined byte.

13. The apparatus of claim 8, wherein the maximum recording speed information was recorded in a predetermined region of the recordable region of the at least one non-user data area of the storage medium by the manufacturer of the storage medium during the manufacture of the storage medium; and the controller cannot control the optical pickup to record any data in the predetermined region of the recordable region of the at least one non-user data area of the storage medium in which the maximum recording speed information was recorded.

14. An apparatus for recording data on a storage medium comprising a user data area to record user data, and at least one non-user data area arranged adjacent to the user data area along a circumference of the storage medium to record information and having a recordable region and an embossed data region, the apparatus comprising:
- an optical pickup to record data on the storage medium; and
- a controller to control the optical pickup to record data in the user data area of the storage medium at an optimal recording speed determined based on a maximum recording speed corresponding to one of a plurality of compatible recording speeds indicated by compatible recording speed information recorded in the recordable region of the at least non-user data area of the storage medium by a manufacturer of the storage medium during manufacture of the storage medium;

wherein:
- the maximum recording speed is an actual maximum recording speed of the storage medium obtained by the manufacturer of the storage medium during the manufacture of the storage medium by testing actual recording characteristics of the storage medium based on a prescribed recording speed assigned to the storage medium by the manufacturer during the manufacture of the storage medium and indicated by prescribed recording speed information recorded in the embossed data region of the at least one non-user data area of the storage medium by the manufacturer during the manufacture of the storage medium; and
- the maximum recording speed is different from the prescribed recording speed if a result of the testing indicates that the storage medium cannot record data at the prescribed recording speed.

15. The apparatus of claim 14, wherein the compatible recording speeds comprise:
- the maximum recording speed; and
- a minimum recording speed of the storage medium obtained by the manufacturer during the manufacture of the storage medium; and
- the compatible recording speed information recorded in the recordable region of the at least non-user data area of the storage medium by the manufacturer during the manufacture of the storage medium comprises:
- maximum recording speed information indicating the maximum recording speed; and
- minimum recording speed information indicating the minimum recording speed.

16. The apparatus of claim 14, wherein the recordable region comprises a predetermined byte;
- the compatible recording speed information comprises a plurality of individual compatible recording speed information respectively indicating individual ones of the compatible recording speeds; and
- the plurality of individual compatible recording speed information are recorded in corresponding bits of the predetermined byte.

17. The apparatus of claim 14, wherein the recordable region comprises a disc ID zone in which disc ID information is recorded;
- the disc ID zone comprises at least one disc ID information region and a reserved region; and
- the compatible recording speed information indicating the compatible recording speeds is recorded in at least one of the at least one disc ID information region, or in the reserved region.

18. The apparatus of claim 14, wherein the compatible recording speed information was recorded in a predetermined region of the recordable region of the at least one non-user data area of the storage medium by the manufacturer of the storage medium during the manufacture of the storage medium; and
- the controller cannot control the optical pickup to record any data in the predetermined region of the recordable region of the at least one non-user data area of the storage medium in which the compatible recording speed information was recorded.

* * * * *